No. 797,986. PATENTED AUG. 22, 1905.
D. W. TAYLOR.
BULKHEAD DOOR.
APPLICATION FILED MAR. 21, 1904.
3 SHEETS—SHEET 2.
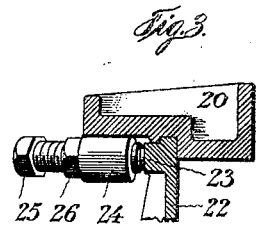
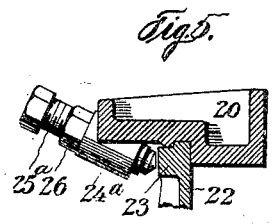
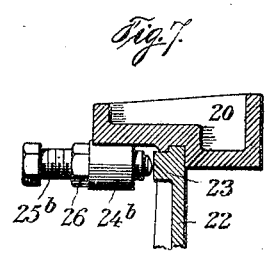
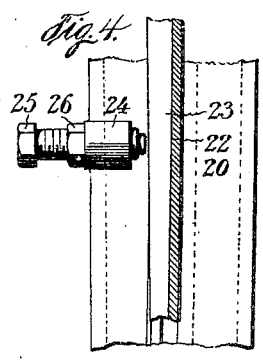
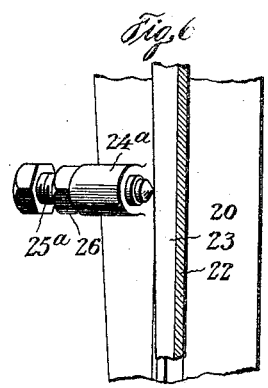
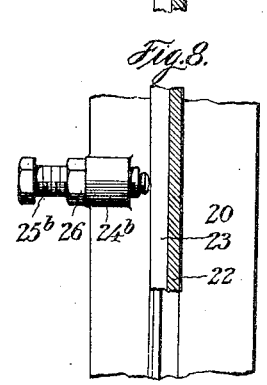
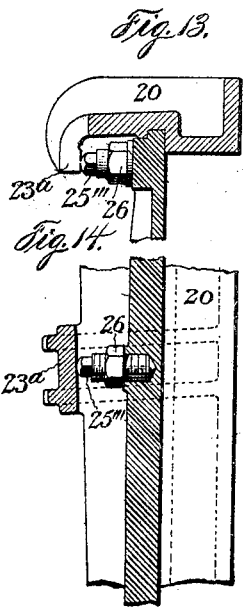
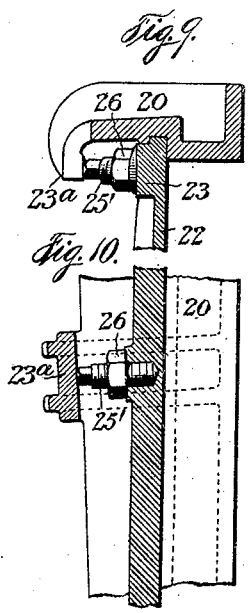
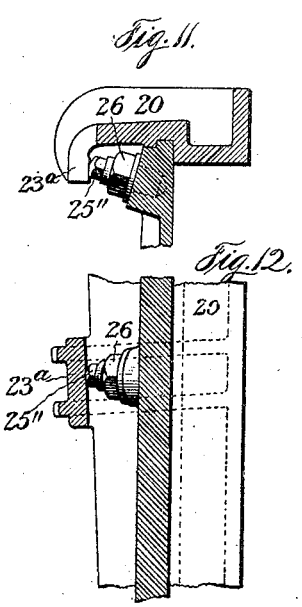
Inventor.
David W. Taylor.
by Henry Orth Jr.
Attys.
Witnesses:

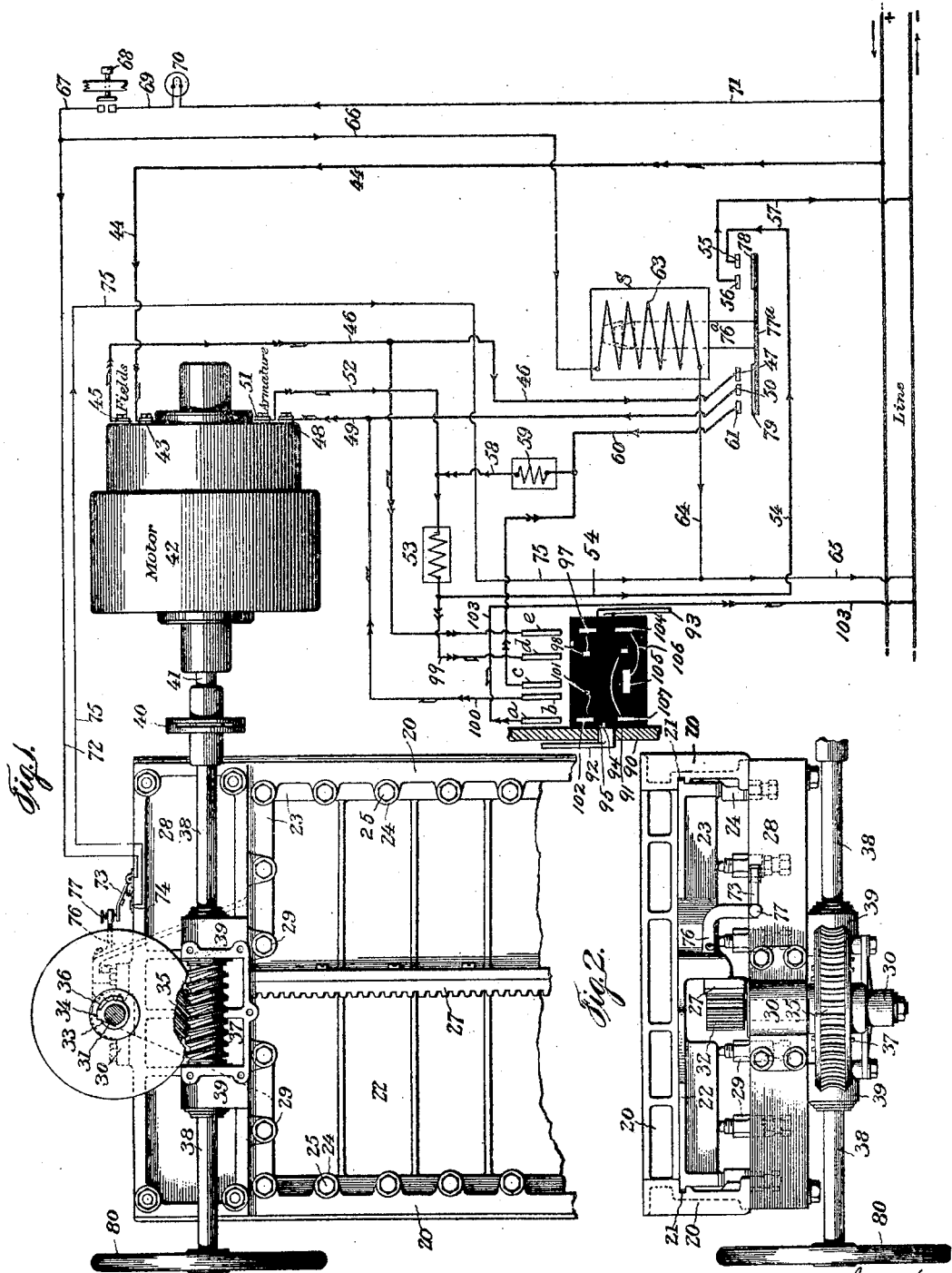

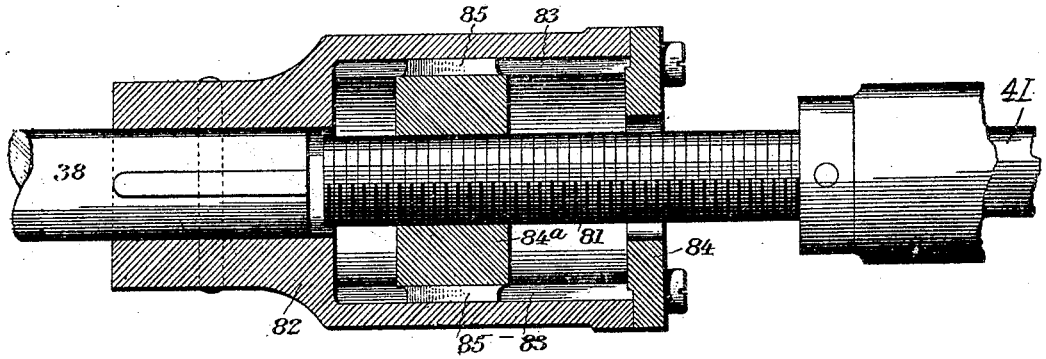
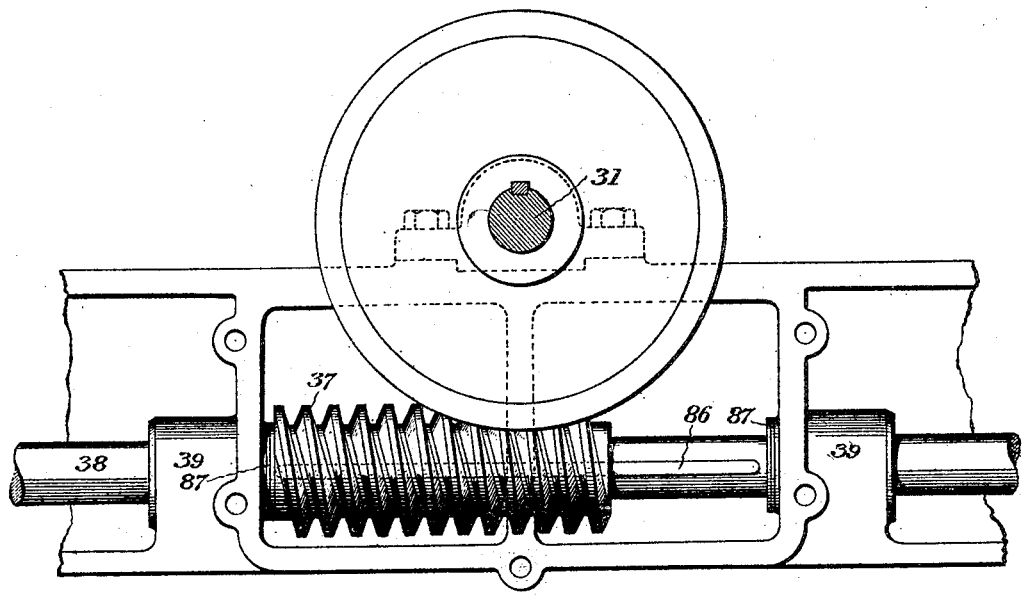
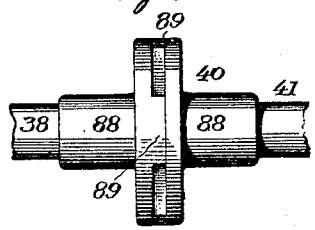
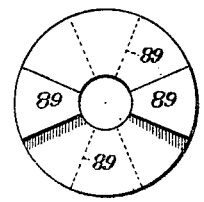

UNITED STATES PATENT OFFICE.

DAVID W. TAYLOR, OF WASHINGTON, DISTRICT OF COLUMBIA.

BULKHEAD-DOOR.

No. 797,986.          Specification of Letters Patent.          Patented Aug. 22, 1905.

Application filed March 21, 1904. Serial No. 199,267.

*To all whom it may concern:*

Be it known that I, DAVID W. TAYLOR, a citizen of the United States, residing at Washington, District of Columbia, have invented certain new and useful Improvements in Bulkhead-Doors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

My invention relates to bulkhead-doors; and it consists of a fixed member or frame to be secured to the bulkhead and a movable member or door with wedging-surfaces on one of the members and adjustable studs or pins on the other member to coöperate to wedge the members together and means to operate the movable member and to jog it into and out of its seat, an indicator which works when said means are controlled from a distant station, together with details of construction to be hereinafter described and claimed.

Referring to the drawings, in which like parts are similarly designated, Figure 1 is an elevation of so much of the entire structure as will enable an understanding of the operation. Fig. 2 is a top plan view of the door, frame, and operating mechanism shown in Fig. 1. Fig. 3 is a horizontal and Fig. 4 a vertical section showing the wedge-flange on the movable member and one of a number of contacting screw-studs on the fixed member, the flat end of the screw being parallel to the face of the wedge to give surface contact. Figs. 5 and 6 are similar views showing line-contact; Figs. 7 and 8, also like views showing point-contact. Figs. 9 and 10 are views like Figs. 3 and 4, showing the contact-screws on the movable member. Figs. 11 and 12 are like 9 and 10, showing line-contact. Figs. 13 and 14 show point-contact, and Figs. 15, 16, 17, and 18 show different forms of idle-motion devices.

The fixed member or frame is indicated at 20 and is provided with the usual groove 21, in which slides the moving member or door 22, that is provided near its edges with a continuous or discontinuous wedge 23. The fixed member or frame 20 is provided with lugs 24, that project over the wedge 23, that is shown in Fig. 1 as a substantially continuous flange around the edge of the door. In each lug 24 is an adjustable contact device or stud, here shown as screw studs or bolts 25, screwed through the lugs and provided with a lock-nut 26. Figs. 1, 3, and 4 show these bolts screwed through the lugs 24 and perpendicular to the inclined face of the wedge 23, so that the flat end of the screw will be engaged by the wedge as the door is closed, thus giving the greatest possible area of contact with such a construction, the surface of the wedge engaging the flat surface on the end of the screw.

Line-contact in which the line of contact is transverse to the wedge is given by the structure shown in Figs. 5 and 6, where the lug $24^a$ is inclined and the bolt $25^a$ or equivalent element having a conical end is screwed through the lug and locked by a lock-nut 26, there being but substantially only one element of the conical end of the screw $25^a$ in contact with the wedge and transverse to it.

Point-contact is shown in Figs. 7 and 8, in which the lug $24^b$ has screwed through it a bolt $25^b$, having a spherical end, there being but substantially a single point of contact between the spherical end of the bolt $25^b$ and the surface of the wedge 23.

In all of the above-described figures the wedge has been shown on the movable member or door; but in Figs. 9 to 14 I have shown the wedge on the fixed member or frame and in this case shown the wedge as discontinuous, there being short sections of the wedge only at those points where wedging pressure is to be applied. The frame 20, Figs. 9 and 10, is provided with short wedge-sections $23^a$, that overhang the line of contact pins or bolts, and in these particular figures the bolt 25', having a flat end, is screwed directly into the door perpendicular to the face of the wedge $23^a$ to give surface contact and is locked by a nut 26. In Figs. 11 and 12 a bolt 25'', having a conical end, is screwed into the door 22 at such an angle that an element of the conical end of the bolt 25'' will be transverse of the surface of the wedge $23^a$. In Figs. 13 and 14 the bolt 25''' has a spherical end to give point-contact with the wedge $23^a$. The door, Fig. 1, is provided with a central longitudinal operating-rack 27, as is customary in some of these structures. At one end of the door, at the top in the case of a vertically-sliding door, there is bolted across the frame a bridge 28, provided across its lower portion with lugs 29, similar to those on the frame and through which bolts 25 pass to engage that portion of the wedge 23 across the top of the door, the door being longitudinally movable in the frame and behind the bridge. On the bridge are bearings 30, in which is mounted a shaft 31, carrying a pinion 32, that projects behind the bridge and engages the rack 27. This shaft is provided with an enlarged portion 33, having a feather 34 on it. On the enlarged portion is mounted a worm-wheel 35, provided with an arcuate recess 36 in its hub, in which the feather is free to rotate, so that the wheel can make a partial turn (here shown as a quarter-revolution) without actuating the shaft 31. On the bridge 28 is a worm 37 on a shaft 38, mounted in bearings 39, said worm engaging the worm-wheel 35 to rotate it. The worm-shaft 38 is connected by a clutch 40, having idle motion for a partial turn, to the shaft 41 of an electric or other motor 42. One terminal 43 of the field-windings of the motor is directly connected to line by wire 44, and the other terminal 45 is connected by wire 46 to a contact-point 47, being one of a number that are simultaneously connected to line by any suitable mechanism. One of the armature-terminals 48 is connected by wire 49 to a contact 50, and the other armature-terminal 51 is connected by wire 52, series resistance 53, and wire 54 to contact 55. Contact 56 is directly connected to line by wire 57. Wire 52 is also connected by a branch wire 58, resistance 59, and wire 60 to a contact 61.

S is a solenoid-switch whose solenoid 63 is connected at one end by wires 64 and 65 to one of the line-wires and at the other end, through wire 66, wire 67, push-button 68 or other hand-operated contact, wire 69, lamp 70 in series, and wire 71, to the other line-wire. From wire 66 there is a branch wire 72 leading to a spring-retracted contact-arm 73, mounted on the bridge 28 or other stationary part. This arm 73 contacts with a point 74, connected by wires 75 and 65 directly to line. On the door is a bracket 76, carrying at its free end an adjustable screw 77, that engages the arm 73 to close circuit through 73 74 when the door is closed. The core 76ª of the switch S carries an arm 77ª, that has two conductive plates, one, 78, to connect the contacts 55 and 56 and the other, 79, to connect the contacts 47, 50, and 61.

In addition to the distant-control appliances described above the motor is fitted with local-control switches or controller, as customary with such apparatus, by which it can be operated in either direction from the vicinity of the door.

90 represents a section through the bulkhead, and mounted therein is a cylinder of insulting material 91, carrying suitably-connected contacts and provided with a handle 92 to operate said cylinder from one side of the bulkhead and a handle 93 to operate it from the other side. On the bulkhead is a lug or stop 94, that is engaged by a stop 95 on the cylinder 91, so that the cylinder will not be rotated too far by the operator. In line with the contacts are a suitable number of controlling-fingers $a\ b\ c\ d\ e$ to trail on the contacts on the cylinder to properly distribute the current.

Supposing the door to be open, the operation is as follows: The push-button and lamp are at a distant station, usually the pilot-house. The push-button is depressed to close circuit through the solenoid-switch, which is of such resistance that the lamp 70 only glows red. The solenoid 63 is energized. The core 76ª is drawn up to connect contacts 55 and 56 through plate 78 and contacts 47, 50, and 61 through plate 79. Current will then pass from the positive line-wire, wire 44, terminal 43, field-winding of the motor, terminal 45, wire 46 to contact 47, plate 79, where the current divides, part going to the armature through contact 50, wire 49, armature-terminal 48, armature, armature-terminal 51, and wire 52, the other part going by plate 79, contact 61, wire 60, resistance 59, wire 58 to join wire 52, then through the resistance 53, wire 54, contact 55, plate 78, contact 56, wire 57 to the negative line-wire, thereby starting the motor 42, which is series wound. The motor when started by the distant-control appliances, as above described, operates to close the door. While so operating the slack of the clutch 40 is necessarily taken up; but the slack or idle motion of the worm-wheel 35 on the shaft 31 may or may not be taken up. In either case when the door is arrested by contact between wedges and studs the motor is still revolving rapidly. When all slack has been taken up, the inertia of the motor and other moving parts will be suddenly applied to the pinion 32 and rack 27 to jog the door home to its final position. As the door receives the jog the adjustable screw 77 in bracket 76 on top of the door forces down arm 73 against its spring and closes circuit through contact 74 and wires 75 and 65 to line, short-circuiting the solenoid-switch S to throw the full current through the lamp 70 and cause it to glow full, thereby indicating at the distant station that the door is closed. The solenoid-switch S being short-circuited has not sufficient pull to keep its core up. This drops, and thus breaks all the contacts and cuts the motor out of circuit.

The solenoid-switch described above is not novel, and other known electrical contrivances may be used to start the motor from a distance.

The door being closed, as above described, and the slack all taken up, may be opened by hand or by the motor, the latter being started by the local contact-switch. When the door has been closed, as above described, it is jammed tight on its seat and a considerable force is required to start it. The operating mechanism is also jammed, requiring to overcome its initial friction a force greater than that due to the torque of the motor at rest. The motor, however, is connected to the mechanism through the clutch 40, which allows it to turn freely through a fraction of a revolution. The inertia thus accumulated by the motor is sufficient to overcome the initial friction of the mechanism, which operates freely for a number of revolutions of the motor until the lost motion between the shaft 31 and worm-wheel 35 is taken up, whereupon the inertia of the moving motor and mechanism is suddenly applied through the pinion 32 and rack 27 to jog the door from its seat against its initial friction. The door once jumped from its seat the motor continues to raise it at a uniform speed until it comes to any desired point.

Supposing the door to be closed and it is desired to open it by means of the local control-switch at the door, handle 92 or 93 is turned to bring the contacts shown on the upper part of cylinder 91 under the fingers. Current will then pass from line (half-arrows) by wire 44, terminal 43, field-windings, terminal 45, wires 46 and 96, finger $e$ to contact 97 on cylinder 91, which is electrically connected to contact 98, thence by finger $d$, wire 99, resistance 53, wire 52, terminal 51, armature, terminal 48, wires 49 and 100 to finger $b$ and contact 101, which is electrically connected to contact 102, thence by finger $a$ and wire 103 to line, thereby reversing the direction of the current through the armature and reversing the direction of rotation of the motor to open the door. By continuing the movement of the handle after the door has been opened the fingers will leave the upper line of contacts and circuit will be broken, while a further movement will rotate the cylinder 91 to bring the lower line of contacts under the fingers to close the door again, current passing from line through wire 44, (double arrows,) terminal 43, fields, terminal 45, wires 46 and 96 to finger $e$, contact 104 on the cylinder 91, that is electrically connected to contact 105, which is broad enough to contact with both fingers $b$ and $c$. From finger $b$ current passes to wires 100 and 49 to terminal 48, armature, terminal 51, wire 52, resistance 53, wire 99, finger $d$, contact 106, that is electrically connected to contact 107, finger $a$, wire 103 to line-shunt. Current passes through finger $c$, wire 108, resistance 59, wire 58, resistance 53, wire 99, and back to line, as above described.

I use in place of the clutch 40 and the loose worm-wheel, to permit a number of idle revolutions of the motor, the device shown in Fig. 15, which is fitted in the place of clutch 40 and is used with a worm-wheel keyed tight on its shaft. The end of the motor-shaft 41 is threaded, as shown at 81. The worm-shaft 38 has keyed to its end a sleeve 82, provided with internal feather-ways 83 and an end plate 84. On the threaded end of the motor-shaft is a nut $84^a$, having feathers 85 slidable in the ways 83. The motor will make several revolutions, causing the nut $84^a$ to slide in the sleeve 82 until it takes either against the end of the sleeve or against the plate 84, thereby locking shafts 38 and 41 and causing them to turn together.

In Fig. 1 I have shown the worm-wheel loose on its shaft 31 and having a quarter-turn of idle movement, the worm 37 being fixed on shaft 38; but in Fig. 16 I have shown the worm 37 slidable on shaft 38, a feather 86 engaging the worm to prevent its rotation on the shaft. By revolving the shaft 38 the worm 37 will longitudinally travel on the shaft 38 and feather 86 until stopped by jam-plates 87 at either end of its travel, said plates surrounding the shaft 38 at the bearings 39. The worm being no longer permitted to move longitudinally will then begin to drive the worm-wheel.

The clutch 40 is shown on a larger scale in Figs. 17 and 18 and is composed of two members 88, both identical in construction and one secured to each of the shafts 38 and 41. Fig. 18 shows the face of one of these clutch members, here shown as having oppositely-disposed sectors 89 of one-eighth of a circle, giving a quarter-revolution of idle movement.

Should there be a small lump of coal at the bottom of the door, the final jog given the door will ordinarily be sufficient to cut it; but should the door not be able to do so the lamp will not glow full, indicating to the operator at the distant station that the door has not closed. Should the lamp fail to glow red when the distant control-circuit is closed, it indicates to the operator at the distant station that the distant-control appliances are inoperative.

The motor shown in Fig. 1 is series-wound; but compound or shunt wound motors are also applicable. Whatever the type of motor, it should be of such construction that the full voltage may remain on with the motor at rest for a reasonable time without damage to the motor. This is readily accomplished by the well-known device of sufficient resistance in series with the armature to prevent abnormal current passing when the motor is stopped. The loss of efficiency incident to this device is not of serious importance for motor-operating doors.

Heretofore it has been difficult to adjust the double wedges customarily fitted on sliding water-tight doors to insure water-tightness when the door is closed. To accomplish this result requires very careful and difficult work. By the structure herein shown and described the screw-studs can be adjusted with the door closed under water-pressure by simply loosening the lock-nuts and screwing up the slack studs until there is no leakage.

Having thus described my invention, what

I claim as new therein, and desire to secure by Letters Patent, is—

1. The combination with a fixed member or frame and a movable member or door; of a wedge on one of the members and an adjustable stud on the other member to coöperate with the wedge to form a tight closure, substantially as described.

2. The combination with a fixed member or frame and a sliding member or door; of a wedge on one of the members and an adjustable screw-stud on the other member to coöperate with the wedge to form a tight closure, substantially as described.

3. The combination with a fixed member or frame and a sliding member or door; of wedges on the door and screw-studs on the frame to coöperate with the wedges to form a tight joint between the members, substantially as described.

4. The combination with a fixed member or frame and a sliding member or door; of a substantially continuous wedge-flange around the door, and screw-studs in the frame engaging the flange and coöperating therewith to form a tight joint, substantially as described.

5. The combination with a fixed member or frame and a sliding member or door; of a substantially continuous wedge-flange around the door, screw-studs on the frame engaging the flange and lock-nuts to hold the studs in position, substantially as described.

6. The combination with a fixed member or frame and a sliding member or door; of a wedge on the door, lugs on the frame overhanging the wedge, a screw-stud in each lug and lock-nuts to hold the studs, substantially as described.

7. The combination with a fixed member or frame and a sliding member or door; of a wedge on the door and screw-studs on the frame having flat ends that coöperate with the wedge to form a tight joint between the members, substantially as described.

8. The combination with a fixed member or frame and a sliding member or door, of a wedge on one of the members and adjustable studs on the other member directly coöperating with the wedge, and mechanism to jog the sliding member to and from its seat, substantially as described.

9. The combination with a fixed member or frame and a sliding member or door; of a wedge on one of the members, an adjustable stud on the other member to coöperate with the wedge to form a tight joint between the members and mechanism to operate the sliding member and force it to and from its seat, substantially as described.

In testimony that I claim the foregoing as my invention I have signed my name in presence of two subscribing witnesses.

DAVID W. TAYLOR.

Witnesses:
PHILIP F. LARNER,
HENRY ORTH.